US009804862B2

(12) United States Patent
Dmytryshyn (10) Patent No.: US 9,804,862 B2
(45) Date of Patent: Oct. 31, 2017

(54) TRANSLATABLE TEXTS IDENTIFICATION IN IN-CONTEXT LOCALIZATION UTILIZING PSEUDO-LANGUAGE AND AN EXTERNAL SERVER

(71) Applicant: Serhiy Dmytryshyn, Ternopil' (UA)

(72) Inventor: Serhiy Dmytryshyn, Ternopil' (UA)

(73) Assignee: Crowdin, Inc., Wilmingtin, DE (US)

( * ) Notice: Subject to any disclaimer, the term of this patent is extended or adjusted under 35 U.S.C. 154(b) by 132 days.

(21) Appl. No.: 14/557,432

(22) Filed: Dec. 1, 2014

(65) Prior Publication Data

US 2015/0154181 A1 Jun. 4, 2015

Related U.S. Application Data

(60) Provisional application No. 61/910,959, filed on Dec. 2, 2013.

(51) Int. Cl.
*G06F 9/44* (2006.01)

(52) U.S. Cl.
CPC ................. *G06F 9/4448* (2013.01)

(58) Field of Classification Search
CPC .... G06F 17/28; G06F 17/2854; G06F 17/289; G06F 9/4448
USPC ......... 704/2, 3, 7, 8; 715/264, 265; 717/136, 717/137
See application file for complete search history.

(56) References Cited

U.S. PATENT DOCUMENTS

| | | | | | |
|---|---|---|---|---|---|
| 5,678,039 | A | * | 10/1997 | Hinks | G06F 9/4448 |
| 6,859,820 | B1 | * | 2/2005 | Hauduc | G06F 9/4448 704/2 |
| 7,155,443 | B2 | * | 12/2006 | Kung | G06F 9/4448 |
| 7,406,677 | B2 | * | 7/2008 | Colling | G06F 9/4448 717/106 |
| 7,461,123 | B2 | * | 12/2008 | Hauduc | G06F 9/4448 704/2 |
| 7,536,640 | B2 | * | 5/2009 | Zhang | G06F 9/4448 715/234 |

(Continued)

OTHER PUBLICATIONS http://www.translateincontext.com/en/index.html; Langur In Context Translation website; downloaded on Jul. 16, 2014.

*Primary Examiner* — Martin Lerner
(74) *Attorney, Agent, or Firm* — Carrie Marlene Stroup (57) ABSTRACT

Software-as-a-service system and methods for assisting translators by utilizing in-context localization with a localization editor that permits the translator to easily view how their translations appear on the application interface without having to navigate between different screens (e.g. between the translation input interface, and the screen that displays how it will appear to the viewer). Pseudo-language that comprises extra language with special identifiers is added to a localizable application in place of the original text. The pseudo-language is identified in the runtime, after which it is mapped and replaced with the original text or their translations. An external server is used to generate the pseudo-language based on source texts, and to do the matching by communicating with the application being translated while it is being run with the activated pseudo-language. The translated software comprises a web-based application, content websites and non-web related software, such as mobile applications, desktop software.

11 Claims, 8 Drawing Sheets

(56) References Cited

U.S. PATENT DOCUMENTS

| | | | | |
|---|---|---|---|---|
| 7,716,641 B2* | 5/2010 | McHugh | G06F 9/4448 | 717/124 |
| 8,312,390 B2* | 11/2012 | Fitzpatrick | G06F 9/4448 | 715/762 |
| 8,392,872 B2* | 3/2013 | Bak | G06F 9/4448 | 717/100 |
| 8,434,072 B2* | 4/2013 | Pawlowsky | G06F 9/4448 | 717/137 |
| 8,615,732 B2* | 12/2013 | Kaneko | G06F 8/71 | 717/106 |
| 9,069,759 B2* | 6/2015 | Shoshan | G06F 17/289 | |
| 2004/0111254 A1* | 6/2004 | Gogel | G06F 9/4448 | 704/8 |
| 2004/0243615 A1* | 12/2004 | Kung | G06F 9/4448 | |
| 2005/0251562 A1* | 11/2005 | Hauduc | G06F 17/30905 | 709/217 |
| 2010/0088695 A1* | 4/2010 | Kakinari | G06F 9/4448 | 717/178 |
| 2010/0107114 A1 | 4/2010 | Zachcial | | |
| 2011/0033095 A1* | 2/2011 | Hale | G06F 17/2785 | 382/131 |
| 2011/0313755 A1* | 12/2011 | Oh | G06F 17/289 | 704/3 |
| 2013/0138421 A1* | 5/2013 | Moulder | G06F 17/28 | 704/3 |
| 2013/0227522 A1* | 8/2013 | Lerum | G06F 9/4448 | 717/120 |
| 2014/0249797 A1* | 9/2014 | Liu | G06F 17/2288 | 704/2 |
| 2014/0278347 A1* | 9/2014 | Luo | G06F 17/28 | 704/3 |
| 2014/0372098 A1* | 12/2014 | Arseniev | G06F 17/289 | 704/2 |
| 2015/0161112 A1* | 6/2015 | Galvez | G06F 17/3053 | 704/7 |

* cited by examiner

TRANSLATABLE TEXTS IDENTIFICATION IN IN-CONTEXT LOCALIZATION UTILIZING PSEUDO-LANGUAGE AND AN EXTERNAL SERVER

CROSS-REFERENCE TO RELATED APPLICATION

This application claims the benefit of U.S. Provisional Application 61/910,959 filed Dec. 2, 2013, the entirety which is herein incorporated by reference.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present disclosure is generally directed to a software-as-a-service web-based language translation service to facilitate translating web based applications, content websites and non-web related software such as mobile applications, desktop software, etc.

BACKGROUND OF THE INVENTION

"In context translation and localization" of software applications produces a much higher quality of text translation as compared to more classic approaches—such as when translators work only on lists of texts without seeing the original usage of the text. The various embodiments of the present disclosure relate to improved methods of "in context localization" of software by human translators, wherein the software may be produced and hosted by third parties at remote locations from the translators. The software may be web based applications, content websites and non-web related software, for example.

Most common software localization approaches currently utilize the extraction of translatable texts from application source code, putting the texts to the resource file, and translation of the texts making copies of the resource file. Translated resource files are included in the application in the runtime thus making its user interface available in different languages.

From the methodology perspective, this approach provides good flexibility; however, it requires additional efforts of quality control since resource files are being translated with lack of context. This method makes the overall localization process expensive and error prone.

The prior art does disclose some attempts at "In Context Localization". For example, United States Patent Application 20100107114 by Zachcial describes how in context localization helps translators to do high quality localization. However, the disclosed method is specific to web applications and it does not display the exact approach of how to get the solution accomplished by the end user. As a result, it is not usable for many technologies and development approaches. For example, it cannot be used to localize in-context non-web based applications, such as Android and iOS applications.

SUMMARY OF THE DISCLOSURE

The various embodiments of the present disclosure provide a tool and an online service to assist translators (e.g. professional and/or crowd-sourced volunteers) in efficiently and accurately translating the text displayed on a computer graphical user interface in web-based and non-web-based applications. The translator is able to view their translations as they will appear within the application without having to navigate between different screens (e.g. between where they input the translation, and the screen that displays how it will appear to the viewer).

The various embodiments herein provide solutions that allow computer systems to localize software in runtime, thus providing maximum contextual information to the translator. The software may comprise, for example, web based applications, content websites and non-web related software, such as mobile applications, desktop software, etc. The present disclosure enables an application to be translatable while it is being executed by identifying what part of the application is translatable, with the lowest entrance threshold for the end user, via the injection of pseudo-language and via the utilization of an external translation server for processes coordination (i.e. pseudo-language is used with an integration library).

The various embodiments assist translators by utilizing in-context localization. Pseudo-language, that comprises extra language with special identifiers, is added to a localizable application in place of the original text. The pseudo-language is identified in the runtime, after which it is mapped and replaced with the original text or their translations. An external server is used to generate the pseudo-language based on source texts, and to do the matching by communicating with the application being translated while it is being run with the activated pseudo-language.

In the various embodiments, the present invention(s) may comprise a computerized computer apparatus (e.g. end user device), system, method, and computer-usable medium having computer-readable program code stored thereon for causing the computer system to perform in-context localization to identify what is localizable. The data processing method of the various embodiments of the present disclosure generally comprise the following computer steps of: step 1) an end-user computing device prepares the localization resources accessed on an application server or the end user-application device; step 2) the end-user device then transmits and imports them via a network to a translation server with the text source strings that are to be translated; step 3) the text strings are converted to pseudo-language identifiers by the translation server and transmitted back to the end user device; step 4) the end user device integrates the pseudo-language identifiers as a separate application language in the primary application and stores this on the application server; step 5) the translator computing device accesses and opens the primary application and activates the software library on the primary application that is run with the application localization comprising the pseudo-generated identifiers of the text; and, step 6) the pseudo-generated identifiers are then replaced with source language texts that are able to launch a localization editor via clicking on the text. The localization editor allows the translator to manually input translations or to accept machine translations, and to view how the translation appears on the application interface, all in one display. Then, step 7) the translations are saved on the translation server and transmitted back to be stored in localized resource files on the end-user computing device.

In another embodiment, the invention pertains to an apparatus having at least a processor or microprocessor unit/device, at least one memory unit/device, and at least one storage unit/device. The processor and/or memory are configured to perform one or more of the operations or methods disclosed herein. In another embodiment, the invention pertains to at least one computer readable storage medium having computer program instructions stored thereon that are arranged to perform one or more of the above described operations.

In one or more embodiments, the system employs a software-as-a-service architecture which permits multiple end-user computing devices to simultaneously access the system software on the remote translation server for converting text strings to pseudo-language identifiers.

These and other features of the present invention will be presented in more detail in the following specification of certain embodiments of the invention and the accompanying figures which illustrate by way of example the principles of the invention.

BRIEF DESCRIPTION OF THE DRAWINGS

The present invention will now be further described through various embodiments in reference to the accompanying drawings comprising.

DETAILED DESCRIPTION OF EXAMPLE EMBODIMENTS

Reference will now be made in detail to specific embodiments of the invention. Examples of these embodiments are illustrated in the accompanying drawings. While the invention will be described in conjunction with specific embodiments, it will be understood that it is not intended to limit the invention to these embodiments. On the contrary, the invention is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Unless defined otherwise, all technical and scientific terms used herein have the same meanings as commonly understood by one of ordinary skill in the art to which the invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

As used herein, a "computer" refers to one or more apparatuses and/or one or more systems that are capable of accepting a structured input, processing the structured input according to prescribed rules, and producing results of the processing as output. Examples of a computer may include: a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet computer, a personal digital assistant (PDA), a portable or mobile telephone or other mobile computing device; and generally, any apparatus that may accept data, process data according to one or more stored software programs, generate results, and typically include input, output, storage, arithmetic, logic, and control units.

As used herein, a "computer system" may refer to a networked system having one or more computers, where each computer may include computer-readable medium embodying software to operate the computer or one or more of its components. Non-limiting examples of a computer system may include: a distributed computer system for processing information via computer systems linked by a network; and, two or more computer systems connected together via a network for transmitting and/or receiving information between the computer systems.

As used herein, the term "processor" may refer to any device or portion of a device or apparatus that processes electronic data from registers and/or memory to transform that electronic data into other electronic data that may be stored in registers and/or memory. A "computer system" may comprise one or more processors.

As used herein, the term "computer-readable medium" refers to any medium that participates in providing data (for example, instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

As used herein, the term "Application" and/or "Software" refer to all, or a portion, of a computer program or software code that carries out a specific function and may be used alone or combined with other programs. Examples of software code in applications may include: code segments in one or more computer-readable languages; graphical and or/textual instructions; applets; pre-compiled code; interpreted code; compiled code; and computer programs. Computer program code for carrying out operations for aspects of the various embodiments may be written in any combination of one or more programming languages, such as: an object oriented programming languages and/or conventional procedural programming languages, and/or programming languages such as, for example, Hypertext Markup Language (HTML), Dynamic HTML, HTML5, Extensible Markup Language (XML), Extensible Style sheet Language (XSL), Document Style Semantics and Specification Language (DSSSL), Cascading Style Sheets (CSS), Synchronized Multimedia Integration Language (SMIL), Wireless Markup Language (WML), JAVA; JavaScript, JINI, C, C++, Objective C or any language operable on a wireless platform like iOS, Ruby, Ruby on Rails, Perl, UNIX Shell, Visual Basic or Visual Basic Script, Virtual Reality Markup Language (VRML), ColdFusion™; Adobe Flash & related languages; or other compilers, assemblers, interpreters or other computer languages or platforms.

As used herein, the term "Application Interface" refers to the image displayed on the user's interface of their electronic computing device. For example, the translator may view an application interface on their graphical user interface of their computer that displays unique identifiers in lieu of text.

As used herein, the term "End-user" refers to the software developer that utilizes the in-context localization method in the various embodiments. The term may also refer to website owners, application publishers, content mangers, and the like.

As used herein, the term "Electronic Computing Device" refers to an end-user's and translator's computer with network connectivity (e.g. Internet) and with a user interface to view and interact with the application interface, such as a laptop, desktop, tablet, etc., as well as any device defined herein as a "computer".

As used herein, the term "Translation server" refers to the computer system server associated with the end-user and/or translator. It may be co-located or remote from the end-user and/or translator and accessible via the network (e.g. Internet), such as a web-based business providing a service to assist translators in localizing end-user software. For example, a project manager may communicate with a translator via the translation server using comments/issues system, a tasks management system, or via any other network based method that they prefer.

As used herein, the term "Localization Resources" refers to the file or set of the files (or database records) that contains the documents, texts and assets (images, audio tracks, video) that need to be localized (i.e. translated and available to be integrated into the application in order to make the application multilingual).

System Architecture

Figure 1:
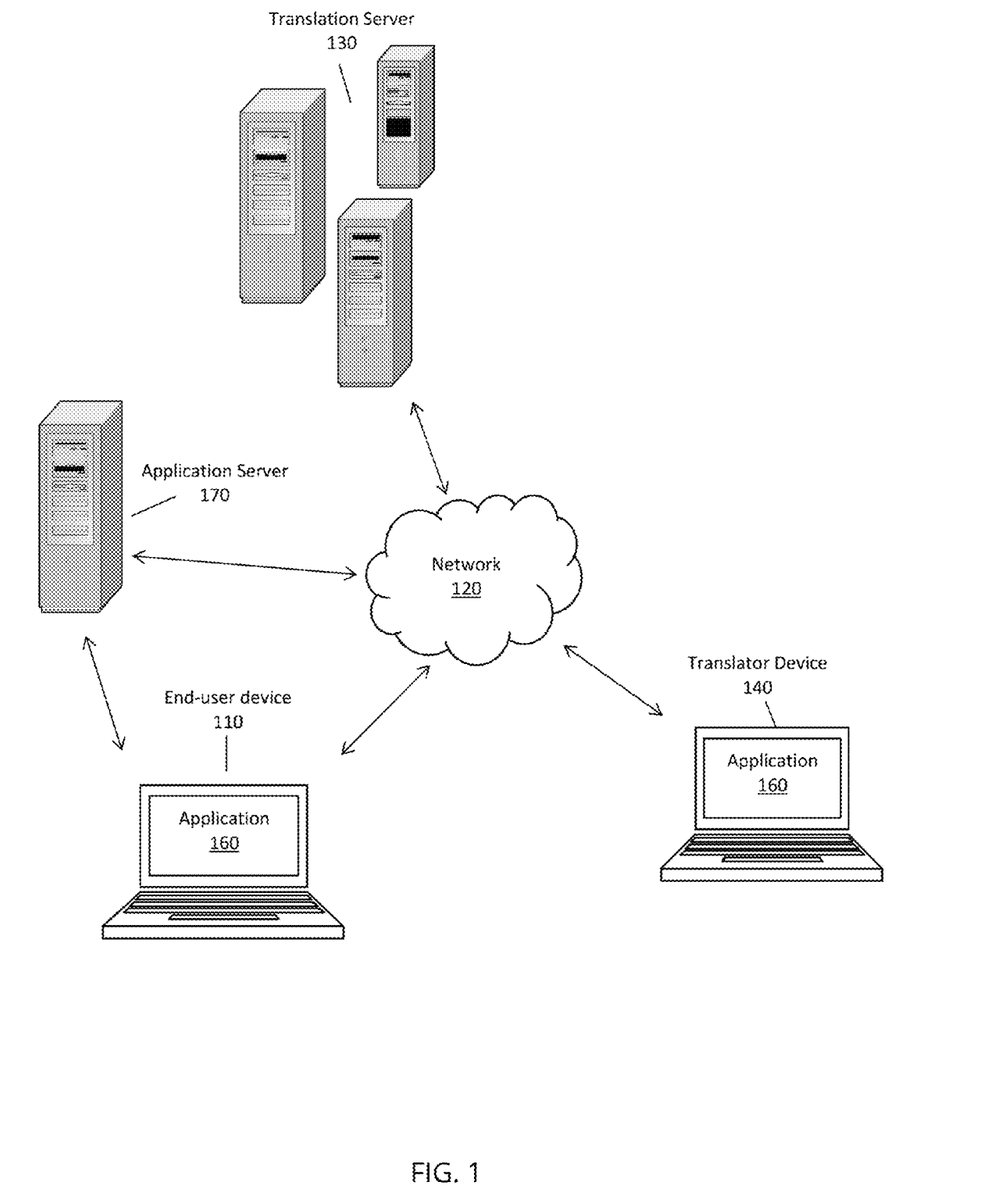
FIG. 1 depicts a block diagram of the system architecture for in-context localization of an application in accordance with one or more embodiments.

Embodiments of the presently disclosed subject matter may be implemented in and used with a variety of components and network architectures. In one or more embodiments, the system may comprise a Service-as-a-Software (SaaS) platform. As illustrated in FIG. 1, the system of the various embodiments may comprise, for example: one or more end-user electronic computing devices 110 communicating via a network 120 (e.g. the Internet) with a translation server 130. The system may further comprise one or more translator's electronic computing devices 140 in communication with the translation server 130 via the network 120. The end-user electronic computing devices 110 and the translator electronic computing devices 140 may also communicate directly via the network 120, and/or with remote servers, databases, cloud computing services and the like. The system may also comprise a separate application server 170 storing the end-user application 160 (e.g. cloud computing), or the application 160 may be stored on the end-user's device.

In one or more embodiments, the translation server 130 represents a web-based entity providing services to translators, and may further comprise one or more central processing units, memory storing computer code for the generation of pseudo-language identifiers, records of subscribers to the web-based service (e.g. translators and translation companies), network interfaces, etc.

The Network 120 may be a local network, wide-area network, the Internet, or any other suitable communication network or networks, and may be implemented on any suitable platform including wired and/or wireless networks. The electronic computing devices 110 and 140 may connect to the network 120 via a variety of methods such as a phone modem, wireless (cellular, satellite, microwave, infrared, radio, etc.) network, Local Area Network (LAN), Wide Area Network (WAN), or any such means as necessary to communicate with the translation server 130.

The network may also comprise various types of computer system configurations, including personal computers, hand-held devices, multi-processor systems, microprocessor-based or programmable consumer electronics, network PCs, minicomputers, mainframe computers, and the like. Where appropriate, embodiments may also be practiced in data centers, cloud computing environments, Software as a Service (SaaS) environments, or other distributed computing environments where tasks are performed by local and remote processing devices that are linked (either by hardwired links, wireless links, or by a combination thereof) through a communications network. In a distributed computing environment, program modules may be located in both local and remote memory storage devices.

Various embodiments of the presently disclosed subject matter may include or be embodied in the form of computer-implemented methods or processes and apparatuses for practicing those methods or processes; and/or, in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer (e.g. device 110, 130, 140, and 170), the computer becomes an apparatus for practicing embodiments of the disclosed subject matter.

The various embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer (e.g. device 110, 130, 140, and 170), the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Lastly, the various embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

End User's and Translator's Computing Device

Figure 2:
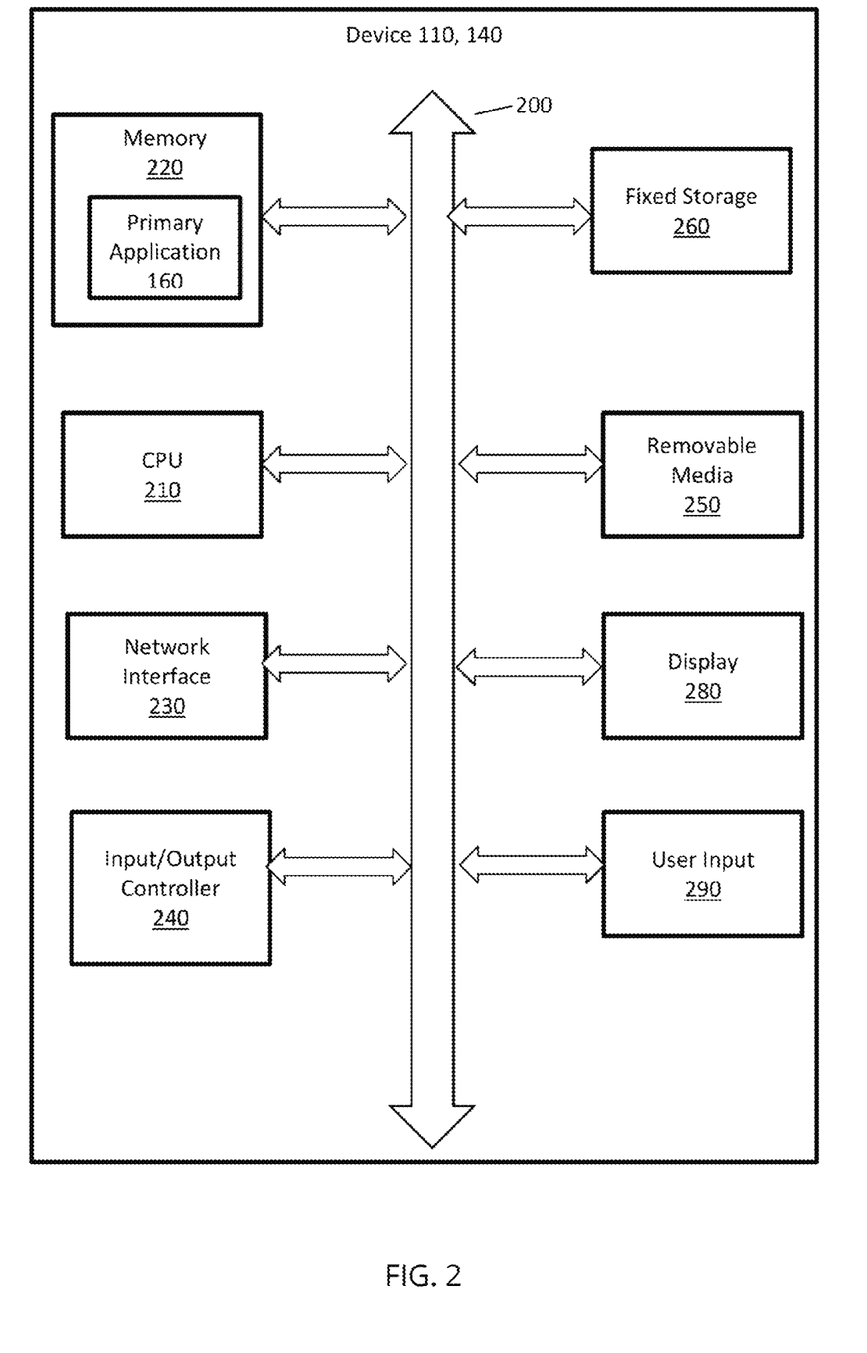
FIG. 2 depicts a block diagram of an end user's and/or translator's electronic computing device used for in-context localization in accordance with one or more embodiments.

As illustrated in FIG. 2, the end-user's electronic computing device 110, and/or translator's electronic computing device 140 comprises an internal bus 200 connecting the major components of each device to its central processing unit (i.e. processor or microprocessor) 210 and memory 220. Devices 110, 140 have the ability to transmit and receive electronic communications via a network interface 230 which allows the devices and servers to communicate with each other via one or more local, wide-area, or other networks. Furthermore, devices 110 and 140 may comprise any one of the following operating systems (OS), for example: Android or Windows or Apple, such as smart-phones, tablets, laptops, desktops, etc.

The network interface 230 may provide a direct connection to a remote server (e.g. Application Server 170 and/or Translation Server 130 as illustrated in FIG. 1) via a telephone link, to the Internet via an internet service provider (ISP), or a direct connection to a remote server via a direct network link to the Internet via a POP (point of presence) or other technique. The network interface 230 may connect the computers using wireless techniques, including digital cellular telephone connection, Cellular Digital Packet Data (CDPD) connection, digital satellite data connection or the like.

Memory 220 comprises read-only memory (ROM) or flash memory containing Basic Input-Output system (BIOS) controlling basic hardware operation including interaction with peripheral components. Memory 220 further comprises random access memory (RAM) comprising the main memory into which the device's operating system (e.g. Android or Windows or Apple), and application programs (e.g. Primary Application 160) are loaded. The application programs can be stored on and accessed via a non-transitory computer readable medium, such as a hard disk drive (e.g., fixed storage 260), an optical drive, floppy disk, or other storage medium.

Bus 200 further connects an input/output controller 240, a user display 280, such as a display screen via a display adapter, a user input interface 290, which may include one or more controllers and associated user input devices such as a keyboard, mouse, touchscreen and the like, a fixed storage 260 (such as a hard drive, flash storage, Fiber Channel network, SAN device, SCSI device, and the like), and a removable media component 250 operative to control and receive an optical disk, flash drive, and the like. The fixed storage 260 may be integral with the device 110, 140 (and 130, 170) or it may be separate and accessed through other interfaces. Computer program code to implement the various embodiments can be stored in computer-readable storage media such as one or more of the memory 220, fixed storage 260, removable media 250, or on a remote storage location.

The user input interface 290 enables a user to enter data and/or instructions to the device 110, 140 (and 130, 170) through one or more corresponding input devices, such as an image scanner w/camera, a touch screen, a keyboard, a mouse, a trackball, a light pen, stylus, or other pointing device, a microphone, a joystick, a game pad, a satellite dish, a scanner, a camcorder, a digital camera, and the like. Similarly, examples of input interfaces 290 that may be used to connect the input devices to the bus 200 include a serial port, a parallel port, a game port, a universal serial bus ("USB"), a firewire (IEEE 1394), or another interface. Lastly, output interfaces connect one or more corresponding output devices to the bus 200, such as a monitor or display screen 280, a speaker, a printer, and the like. An output device can integrated with or peripheral to device, such as a video adapter, an audio adapter, a parallel port, and the like.

Data Processing Method

Figure 3:
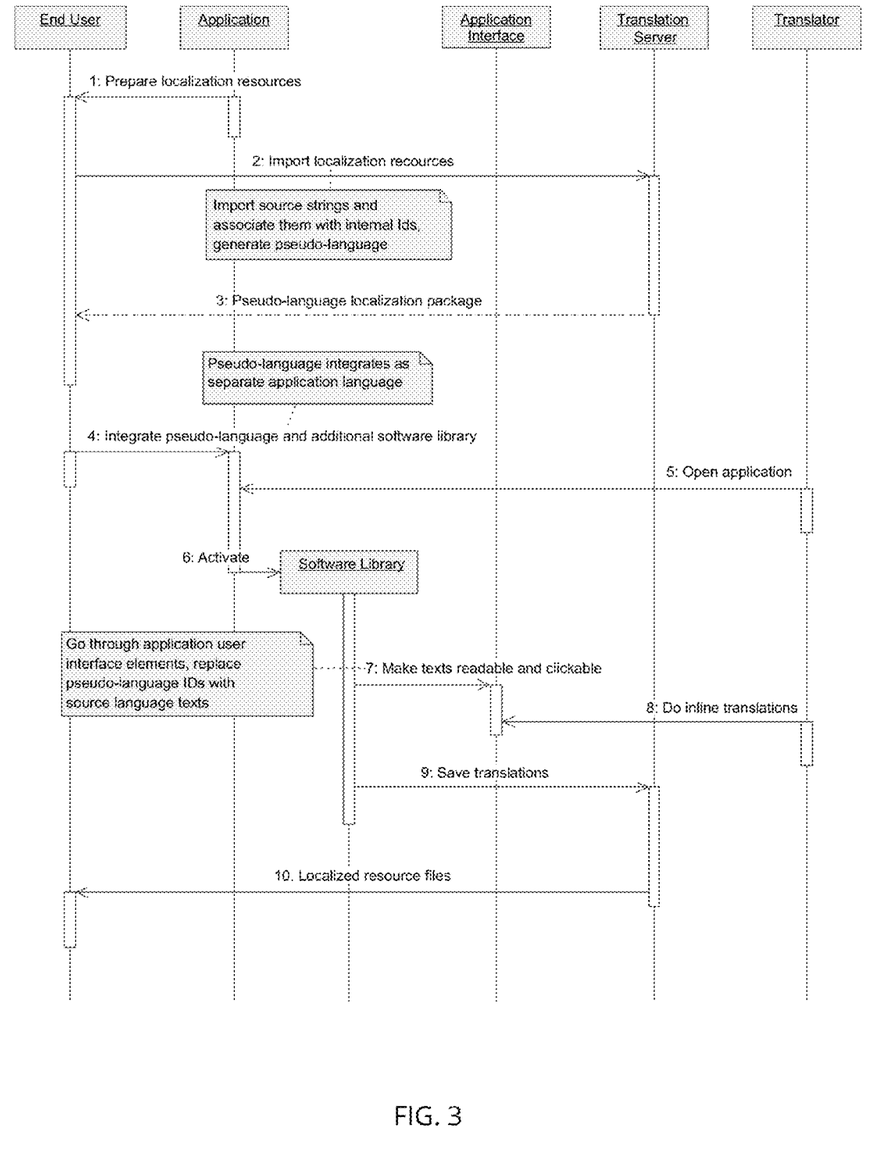
FIG. 3 is a Unified Modeling Language (UML) sequence diagram for the primary method for in-context localization.
Figure 4:
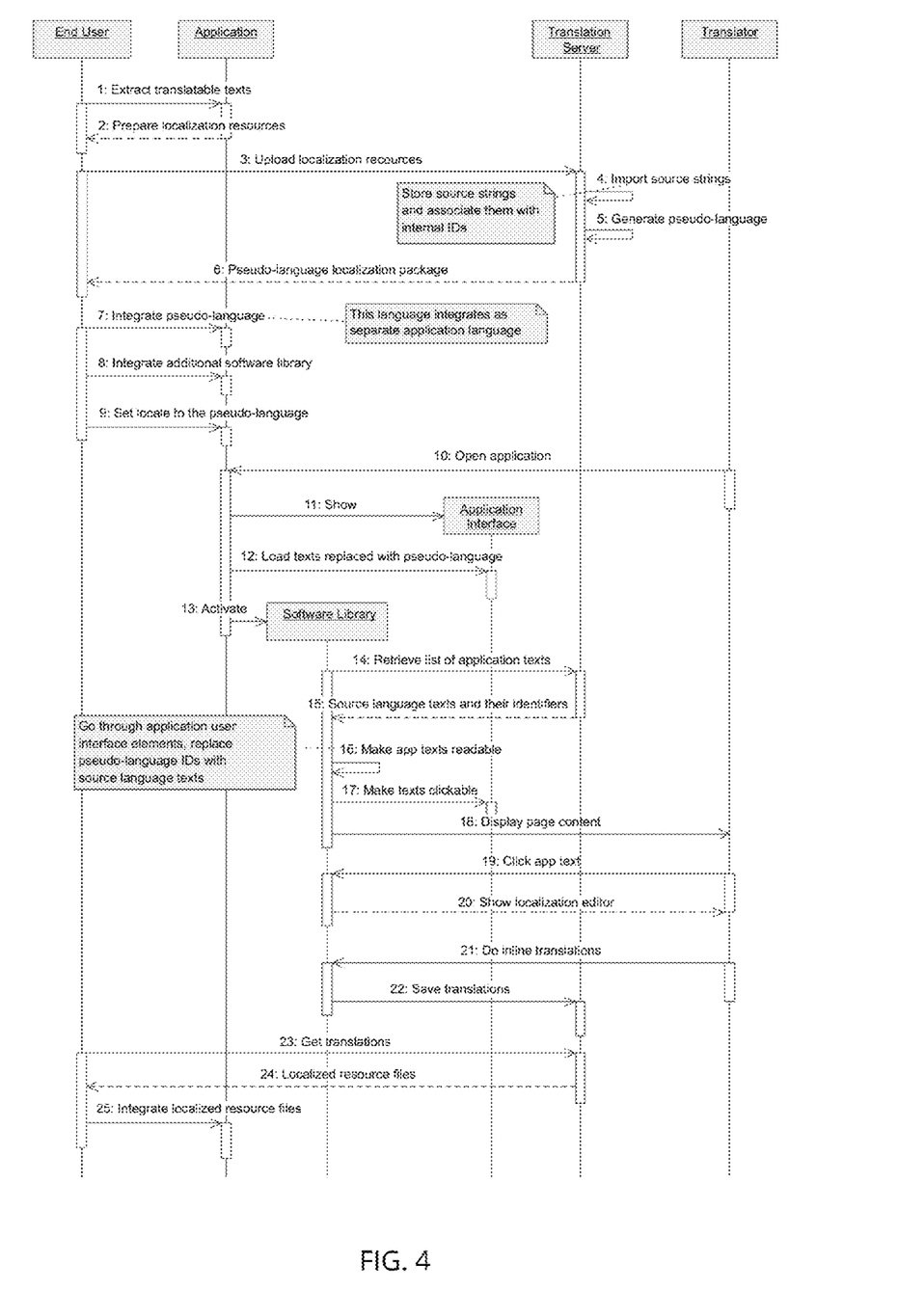
FIG. 4 is a Unified Modeling Language (UML) sequence diagram for the steps of the complete method for in-context localization.

One example embodiment of the present invention is illustrated in the unique modified language (UML) diagram shown in FIG. 3, of which an expanded version illustrated in FIG. 4.

In FIG. 3, step 1, the end-user computing device 110 is used by the software developer to prepare the localization resources, otherwise known as internationalization or "i18n". It comprises a sequence of actions needed to prepare an application for being localizable and multilingual. Texts are identified from the primary application 160 that are to be translated from one language to another language on a translator's computing devices 140. These text strings may be manually selected by the end-user (software developer), or they may be automatically identified and collected by a specialized software library or external solution, such as any text displayed on a user interface is to be translated.

In step 2, the end-user device 110 transmits via the network 120 to the translation server 130 the text source strings to be translated identified in step 1. (See infra "Exemplification of the Pseudo-language Generation"). The text strings are converted to pseudo-language identifiers comprising, for example:

{|reserved-word|string-identifier-at-the-server|:plural-form-of-the-source-string}

They are then transmitted back to and stored on the end-user device 110 (step 3). The "reserved-word" presents certain sequence of characters that allows the program to identify that the string belongs to the pseudo-language (for example "crwdns"); the "string-identifier-at-the-server" presents the string identifier at server or in the resource file where it was imported from; and, the "plural-form-of-thesource-string" indicates that the string has plural forms and what form is being used in this particular case. One of skill in the art would readily know of other methods to generate pseudo-language identifiers.

In step 4, the end-user's device 110 integrates the pseudo-language identifiers as a separate application language in the primary application 160.

In step 5, the translator computing device 140 accesses and opens the primary application 160 via the network 120 when it is a web-based software of website content being translated. When text of non-web related software is being translated, such as on mobile applications, desktop software, etc., the translator computing device 140 opens the application 160 stored in the memory of translator device 140. Either type of application further comprises the software library (from the translation web-service provider) that will communicate via the network with the translation server 130.

Activation of the software library (e.g. from the translation web-service provider) step 6, FIG. 3) on the primary application that is run with the separate application localization causes the creation of pseudo-generated identifiers of the text. The pseudo-generated identifiers are then replaced with source language texts that are able to launch a localization editor via clicking on the text (step 7) (e.g. see FIG. 7). The localization editor allows the translator to manually input translations or to accept machine translations, and to view how the translation appears on the application interface—all on one user interface (step 8) (e.g. see FIG. 8). The translations are saved on the translation server 130, and transmitted back to be stored in localized resource files on the end-user computing device 110 (steps 9 and 10).

Expanded Data Processing Method

End-User Computing Device 110

One embodiment of the present invention is illustrated in the unique modified language diagram shown in FIG. 4, which is an expanded version of the method shown in FIG. 3. The entire process may comprise the following steps. In steps 1-3, the end-user extracts the translatable texts from their primary application 160 that they are trying to translate (step 1), then prepares the localization resources (step 2), and then uploads the localization resources to the translation server (step 3). For example, in step 1 and 2 an end-user (e.g. software developer, website administrator, etc.) extracts translatable texts from application source code twice and puts it to the external resource file; and, then in step 3, the software developer uploads the resource file to the translation server, as shown in FIG. 1, 130.

The translation server 130 then imports and stores on the server database/memory the localization source strings (step 4); and, while assigning each string an internal identification number, otherwise known as the "pseudo-language ID" (step 5). During this process, the translation server 130 using the uploaded files generates an intermediate (pseudo-translated) resource file comprising actual text messages replaced with internal identifiers that will be used later. This pseudo-language localization "package" is then transmitted back to the end-user (step 6).

In step 7 the end-user (software developer) integrates a pseudo-translated resource file as a separate language (separate application localization). The software developer then integrates an additional software library that runs along with localizable application (step 8), and runs the application (step 9), and sets the current application locale to the language with the pseudo-translations generated earlier in step 6.

Translator's Computing Device 140

Figure 5:
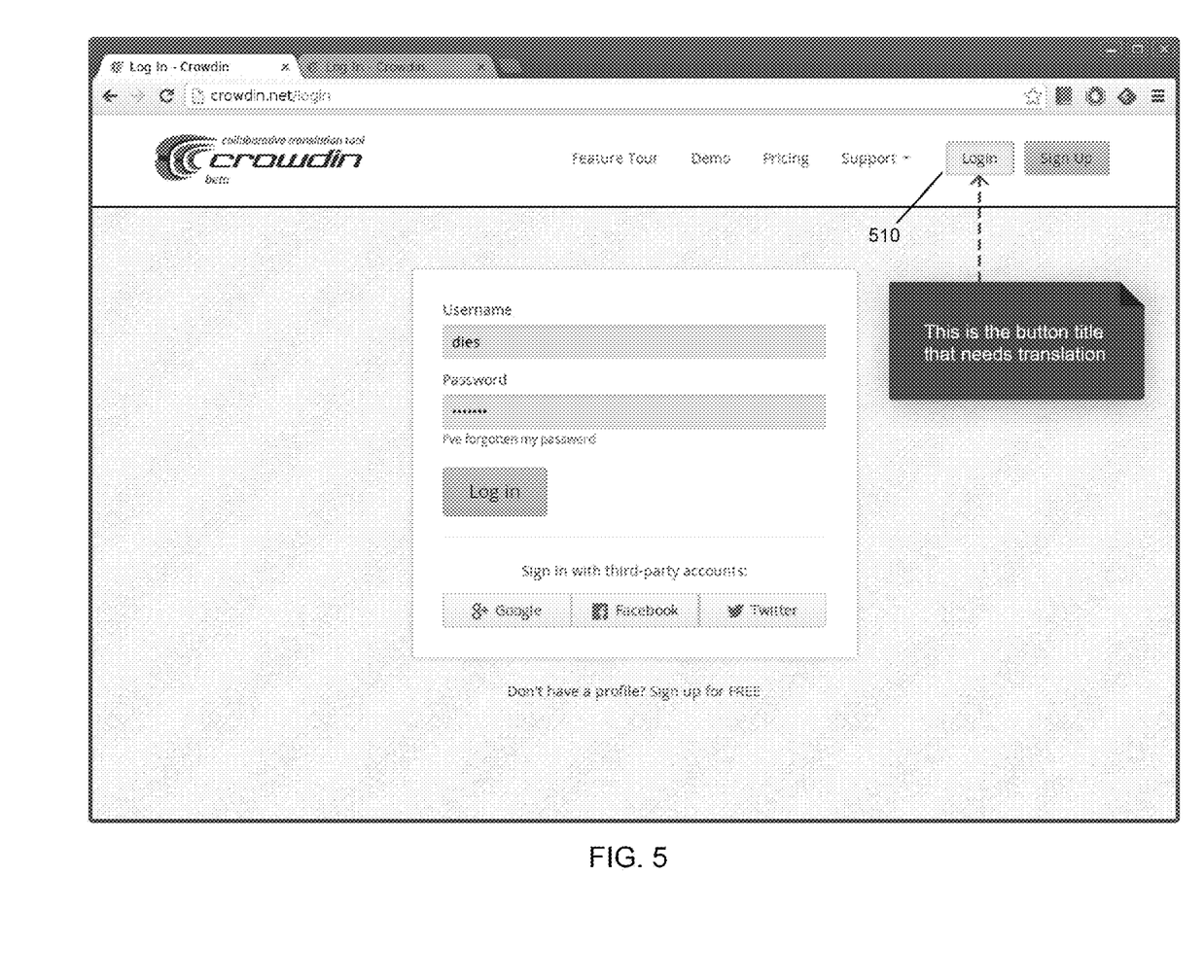
FIG. 5 is a screen shot of a translator selecting text to be translated that is displayed on an application interface.

In steps 10 and 11, the translator using their computing device 140 opens the primary/first application 170 (or web page/web application) via the network (Internet) 110, and views the usable application (or web application) with text in the original app language (e.g. see FIG. 5). In an alternative embodiment comprising in-context localization of mobile applications, the translator will use their mobile device to run the mobile application locally on their device, and the mobile application will have the integration library incorporated into it. That library will communicate with the translation server.

Figure 8:
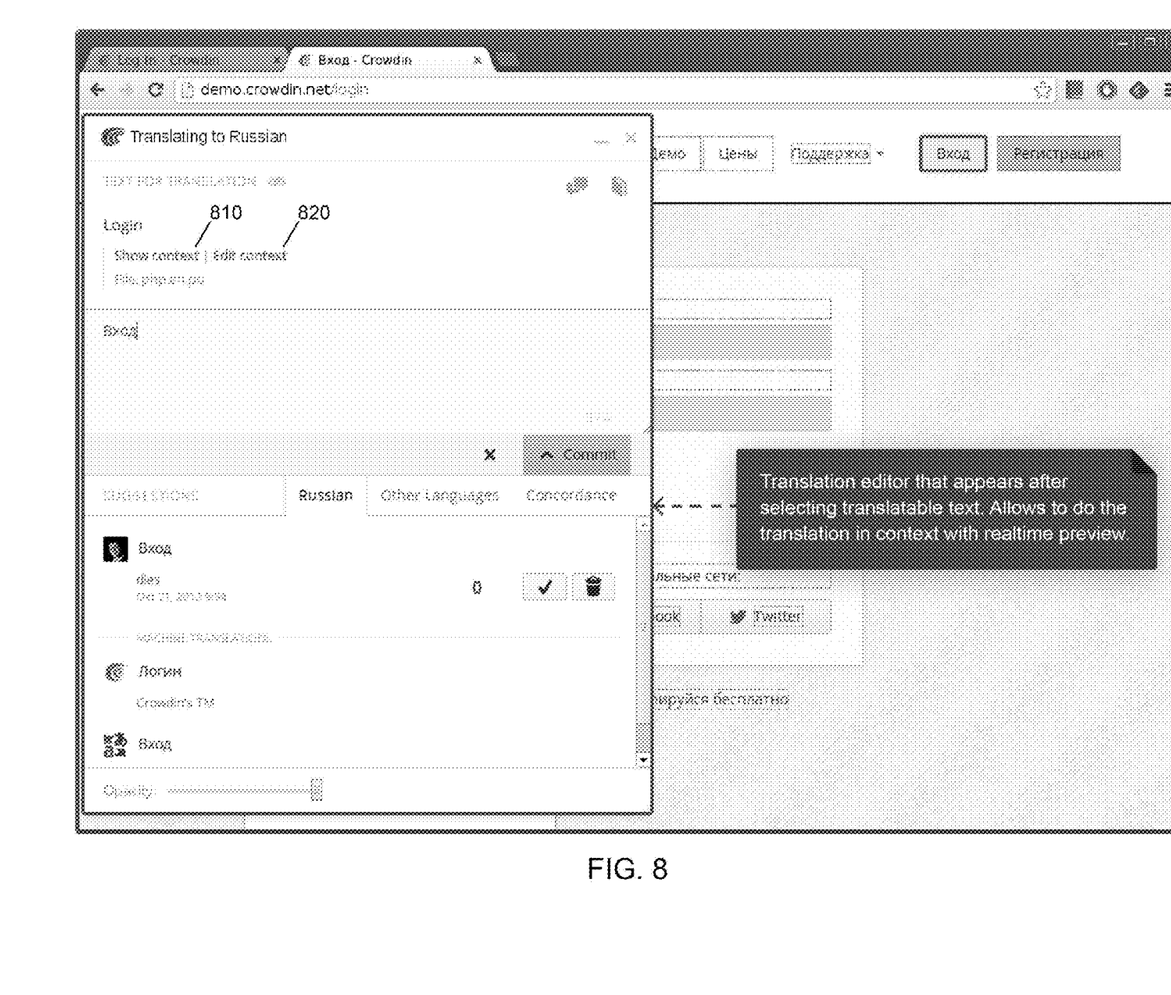
FIG. 8 is a screen shot of the localization editor that permits the translator to view their translation in-context in real-time, and to manually edit it if required.

In steps 12-16, the original text is replaced with pseudo-language identifiers and then back to text that is clickable for the purpose of opening a localization editor (e.g. see FIG. 8). The integrated library, which is started along with the primary application 160, communicates with the translator server 130 that generated the pseudo-language and the library receives the translatable texts and their identifiers from there. The integrated library goes through the application user interface (or traverse web application DOM) identifying pseudo-language identifiers that are displayed instead of actual text messages. It maps those identifiers with the list of source texts received and replaces the identifiers with actual text messages (step 16). The replacement can be done at the application start or later while the application is operable (for translatable text messages that appear dynamically).

Figure 7:
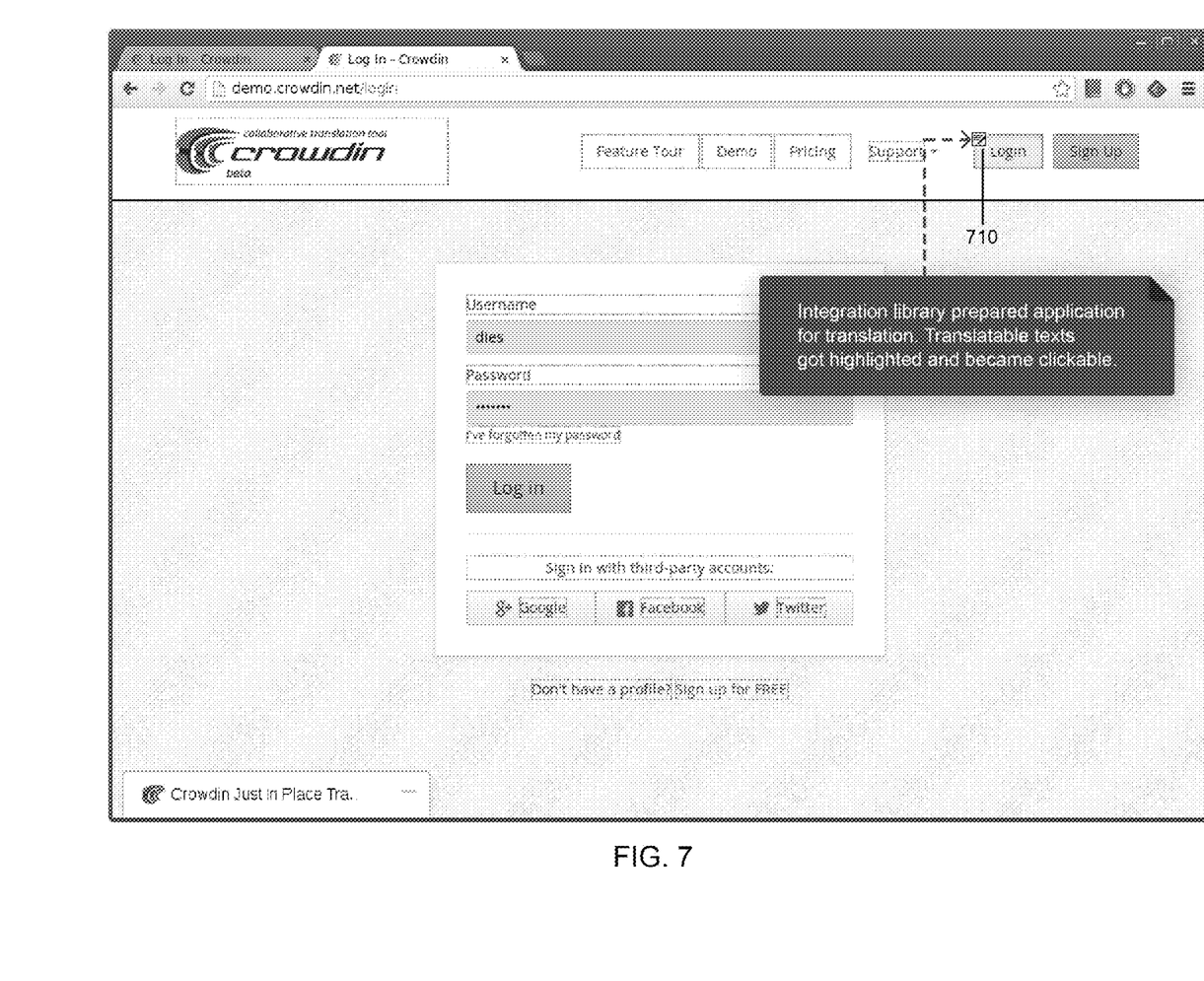
FIG. 7 is a screen shot of an application interface as viewed by the translator after the primary application converts the pseudo-language unique identifiers to source language text and makes the texts readable and clickable.

During steps 17, when replacing the pseudo-language identifiers with readable text, the primary application 160's integration library adds additional event handlers to the replaced text (to the button/link/title etc.) to make the text clickable (e.g. see FIG. 7, 710). The translatable, clickable text is then displayed on the translator's application interface on their computing device 140 (step 18).

Localization Editor

In steps 19 and 20, in response to the translator clicking, touching, tapping, etc. on the text (e.g. the "Login" tab), the primary application 160 opens an additional dialog box in the user interface (or separate window), otherwise known as the "localization editor" (e.g. see FIG. 8). The localization editor allows the translator to manually enter the translation of the text (step 21). Optionally, the translator can see a view of how the translated text is displayed on the user interface of the application.

In step 22, the text that has been completely translated via the present method is stored on the translation server 130. The end-user's device 110 may then retrieve the translations from the server 130 via localized resource files, which can then be integrated into the existing primary application 160 (steps 23-25).

Exemplification of the Pseudo-Language Generation

The following is an exemplification to demonstrate the steps of FIG. 3 pertaining to pseudo-language generation of end-user selected texts. For example, there is a string in the source resource file:

PageContacts.Subject="Email Subject"

"PageContacts.Subject" is the text identifier that is being used by the translatable application to display the text message. "Email Subject" is the text. After uploading to the translation server and pseudo-language generation, the returned resource file string may look like the following:

PageContacts.Subject="{crwdns6654665:0}{cr-wdne6654665:0}"

The brackets contain needed information to have this string identified on the application page and to make it available for translation. The structure of that sample pseudo-translation is the following:

{|reserved-word|string-identifier-at-the-server|:plural-form-of-the-source-string}

Exemplification of Webpage in-Context Localization

The following exemplification comprises the sequence of steps and screen shot views the translator sees on the application interface as illustrated in FIGS. 5-8. In this particular example, the screenshots are of a webpage's "Login" tab being translated via the method of the present invention.

FIG. 5 is an illustration of an application interface with the "Login" tab 510 being selected by the translator to be translated from English to Russian. As per FIG. 3 step 5 and FIG. 4 step 10, the translator using their computing device 140 opens the primary/first application 160 as illustrated in FIG. 2 (or web page/web application) and sees the usable application (or web application) with text messages in the original app language. On this application interface, the translator has the ability to select, via input comprising a mouse click or touch screen tap, etc., on the text 510 of FIG. 5 to be translated.

Figure 6:
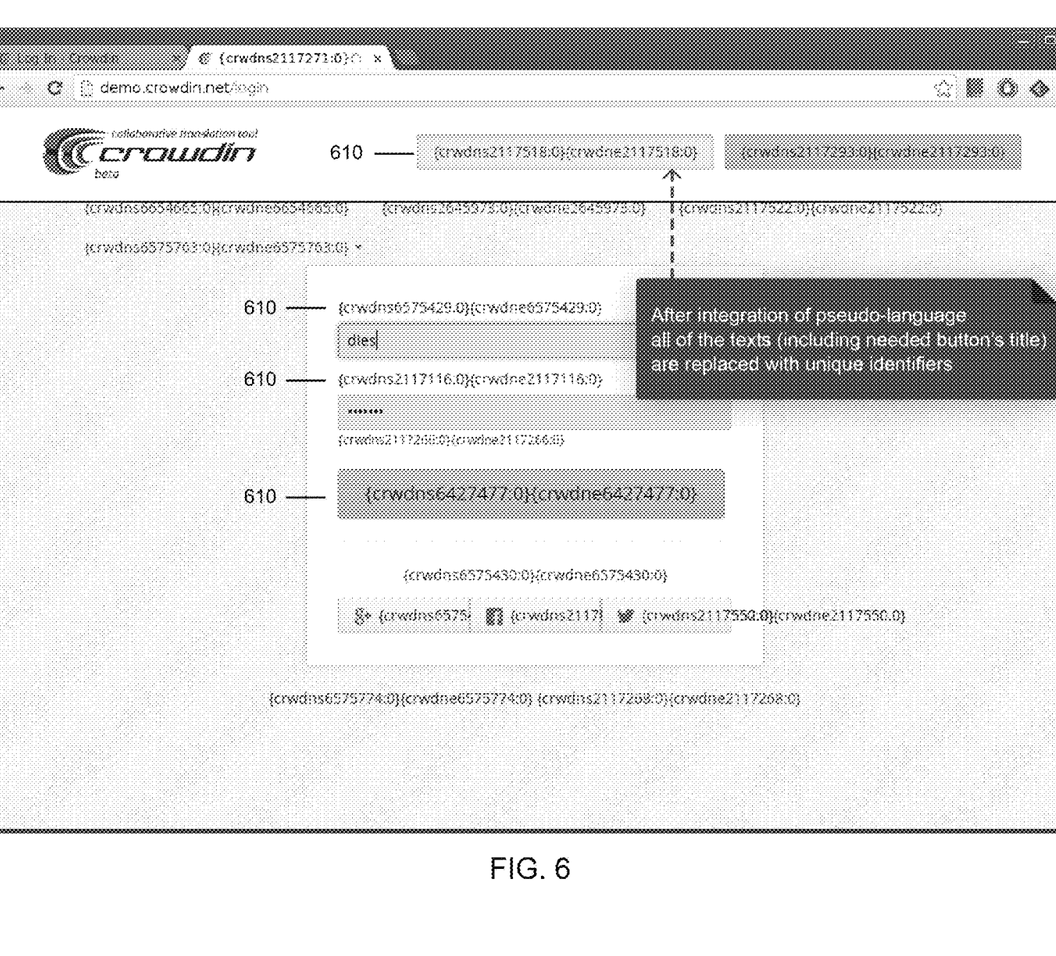
FIG. 6 is a screen shot of an application interface as viewed by the translator and after integration of pseudo-language of all the text, which is replaced by unique identifiers.

FIG. 6 is an illustration of the application interface in response to the translator selecting the "Login" tab 510 and after integration of pseudo-language of all of the texts by software developer (e.g. FIG. 3, step 4, and FIG. 4, steps 7-9). As per FIG. 3, step 4, and FIG. 4, step 12, all of the text on the application interface, and not just the "Login" tab, is replaced with unique identifiers 610. This particular screen shot is an exemplification of when the pseudo-language is integrated but the integration library has yet to be. See supra "Exemplification of the Pseudo-language Generation".

FIG. 7 is an illustration of the application interface as viewed on the translator's computing device 140, and comprising FIG. 3 steps 6-7 and FIG. 4, steps 13-18 for primary application 160 converting the pseudo-language unique identifiers to source language text and making the texts readable and clickable. For example, the translatable text (e.g. "Login" tab) is now highlighted and clickable (see FIG. 7, 710).

FIG. 8 is an illustration of the application interface comprising the localization editor that is displayed on the translator's device 140's user interface in response to selecting (clicking on) translatable text, as per FIG. 3, step 8. The editor allows the translator to view machine translations of the selected text (e.g. "Login" tab), and to accept it, or reject it and manually input their own translation of the text (see FIG. 8, 810, "Edit Content"). The translator can then view their translation via selecting the "Show Content" link (see FIG. 8, 820). This feature enables the translator to more efficiently view how each input they make in displayed on the final application interface, and to easily correct it if required.

CONCLUSION

The aforementioned UML diagrams illustrate the architecture, functionality, and operation of possible implementations of systems, methods, and apparatuses comprising computer program products (aka computer code) and/or computer-usable medium having computer-readable program code stored thereon according to various embodiments of the present invention. In this regard, a step(s) in the UML diagrams may represent a module, segment, or portion of code, which comprises one or more executable instructions for implementing the specified logical function(s).

It should also be noted that, in some alternative implementations, the functions noted in the diagrams may occur out of the order noted in the figures. For example, steps shown in succession may, in fact, be executed substantially concurrently, or the steps may sometimes be executed in the reverse order, depending upon the functionality involved. It will also be noted that each step of the UML diagrams, and combinations of steps, can be implemented by special purpose hardware-based systems that perform the specified functions or acts, or combinations of special purpose hardware and computer instructions.

And, in the above description, an embodiment is an example or implementation of the inventions. The various appearances of "one embodiment," "an embodiment" or "some embodiments" do not necessarily all refer to the same embodiments.

Unless specifically stated otherwise, and as may be apparent from the description and claims herein, terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The various embodiments may also be implemented in an operating environment comprising computer-executable instructions (for example, software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages.

What is claimed is:

1. A data processing method in a software-as-a-service platform of in context localization permitting a translator to view the appearance of textual language translations of a first application in real-time, comprising:
    a. substituting by a remote translation server, pseudo-language identifiers for an application text that is to be translated from a first language to a second language, wherein the pseudo-language identifiers comprise a sequence of characters indicating a string identifier at the remote translation server, or in a resource file on the end user electronic computing device that the application text was imported from;
    b. replacing by a translator computing device in response to the translator's running of the application, the pseudo-language identifiers with the text in the first language and making the text user selectable or clickable;
    c. launching by the translator computing device, a localization editor in response to the translator selecting a translated text, the editor comprising a graphical user interface simultaneously displaying in real-time inputted textual translations or machine translations and the appearance of the translation in the application;
    d. storing the translated text within a memory of the remote translation server;

e. wherein the in context localization is performable in web based applications, content websites, and non-web based applications comprising Android and iOS applications; and f. wherein the pseudo-language identifier comprises the format of: {reserved-word|string-identifier-at-the-server|:plural-form-of-the-source-string}.

2. The data processing method of claim 1, wherein the pseudo-language identifiers are generated by the remote translation server, then transmitted to and stored on the end-user electronic computing device in a separate integration library.

3. The data processing method of claim 1, wherein the pseudo-language identifiers are generated by the remote translation server, then transmitted to and stored on the translator electronic computing device in a separate integration library.

4. The data processing method of claim 1, wherein a translator electronic computing device accesses the pseudo-language identifiers stored on an end-user electronic computing device via a network.

5. The data processing method of claim 4, wherein the translator electronic computing device replaces the pseudo-language identifiers with end-user selectable text in the first language.

6. The data processing method of claim 1, wherein the pseudo-language identifiers are stored as a second application co-located with the first application.

7. The data processing method of claim 1, wherein the text translated into the second language is stored in a localized resource files on a computer that stores the first application.

8. The data processing method of claim 1, further comprising the localization editor:
   a. displaying on a graphical user interface the machine translation of the text;
   b. receiving input from the translator to accept it, or reject it, and receiving a translator's manual input of the translated text in the second language; and,
   c. displaying the appearance of the translated text within the application co-located on the graphical user interface with the translator's input in step (b), and in response to the translator's selection of a link.

9. A network-based computing system for in context localization permitting an end-user to view the appearance of textual language translations of an application in real-time, comprising:
   a. a translation system computer comprising a processor and a memory device operably connected to one another, and a plurality of computer-executable instructions stored on said memory device and executed by said processor, comprising:
      i. computer-executable instructions to convert application text that is selected by an end-user for translation from a first language to a second language with pseudo-language identifiers, wherein the pseudo-language identifiers comprise a sequence of characters indicating a string identifier at the translator server or in a resource file on an end user electronic computing device that the application text was imported from;
      ii. a database storing one or more end-user records comprising user data input, data input from third parties and/or external data sources, pseudo-language identifiers, and one or more textual language translations performed by the system;
   b. an application system computer comprising a processor and a memory device operably connected to one another, and a plurality of computer-executable instructions stored on said memory device and executed by said processor, comprising:
      i. computer-executable instructions for;
         substituting the pseudo-language identifiers for application text that is to be translated from a first language to a second language;
         replacing in response to the translator's running of the application, the pseudo-language identifiers with the text in the first language and making the text user selectable;
         launching, a localization editor in response to the translator selecting the translated text, the editor comprising a graphical user interface simultaneously displaying in real-time inputted textual translations or machine translations and the appearance of the translation in the application;
         storing the translated text within a memory of the application computer and/or the end-user electronic computing device;
      ii. a database storing one or more end-user records comprising user data input, pseudo-language identifiers, integration libraries, and application libraries;
   c. one or more end-user electronic computing devices in communication with the application and translation system computer over a network;
   d. a wired or wireless network connection between the application and translation system computer and the one or more end-user electronic computing devices;
   e. wherein in context localization is performable in web based applications, content websites, and non-web based applications comprising Android and iOS applications; and
   f. wherein the pseudo-language identifier comprises the format of: {reserved-word|string-identifier-at-the-server|:plural-form-of-the-source-string}.

10. The computer system of claim 9, wherein if the application is a non-web based application, then the end-user electronic computing devices comprise one or more translator devices; and, if the application is a web-based application, then the end-user electronic computing devices comprise translator devices and end-user devices storing the web-based application.

11. The computer system of claim 9, further comprising on the applications server computer-executable instructions for:
   a. displaying on a graphical user interface the machine translation of the text;
   b. receiving input from the translator to accept it, or reject it and receiving a translator's manual input of the translated text in the second language; and,
   c. displaying the appearance of the translated text within the application co-located on the graphical user interface with the translator's input in step (b), and in response to the translator's selection of a link.

\* \* \* \* \*